US012682236B2

(12) United States Patent
Park

(10) Patent No.: US 12,682,236 B2
(45) Date of Patent: Jul. 14, 2026

(54) METHOD AND SYSTEM FOR LIGHTWEIGHTING ARTIFICIAL NEURAL NETWORK MODEL, AND NON-TRANSITORY COMPUTER-READABLE RECORDING MEDIUM

(71) Applicant: MAY-I INC., Seoul (KR)

(72) Inventor: Jin Woo Park, Seoul (KR)

(73) Assignee: MAY-I INC., Seoul (KR)

( * ) Notice: Subject to any disclaimer, the term of this patent is extended or adjusted under 35 U.S.C. 154(b) by 606 days.

(21) Appl. No.: 18/270,416

(22) PCT Filed: Nov. 15, 2021

(86) PCT No.: PCT/KR2021/016656
§ 371 (c)(1),
(2) Date: Sep. 12, 2023

(87) PCT Pub. No.: WO2022/145713
PCT Pub. Date: Jul. 7, 2022

(65) Prior Publication Data
US 2024/0104375 A1     Mar. 28, 2024

(30) Foreign Application Priority Data
Dec. 31, 2020     (KR) ........................ 10-2020-0188895

(51) Int. Cl.
G06N 3/08          (2023.01)
G06N 3/045          (2023.01)
(52) U.S. Cl.
CPC ...................................... G06N 3/08 (2013.01)
(58) Field of Classification Search
CPC ...................................................... G06N 3/08
See application file for complete search history.

(56) References Cited

U.S. PATENT DOCUMENTS 11,200,639 B1 * 12/2021 Kim ........................ G06N 3/045
11,449,756 B2 *  9/2022 Deng ..................... G06N 5/022
(Continued)

FOREIGN PATENT DOCUMENTS

KR      1020190062225 A      6/2019
KR      1020200034918 A      4/2020
KR      1020200118815 A      10/2020

OTHER PUBLICATIONS

Saurabh Goyal, et al., "Compression of Deep Neural Networks by Combining Pruning and Low Rank Decomposition", 2019 IEEE International Parallel and Distributed Processing Symposium Workshops (IPDPSW), Rio de Janeiro, Brazil, May 24, 2019, pp. 952-958, doi: 10.1109/IPDPSW.2019.00162.
(Continued)

*Primary Examiner* — Gary S Gracia
(74) *Attorney, Agent, or Firm* — Dinsmore & Shohl LLP; Yongsok Choi, Esq.

(57)          ABSTRACT

A method for light-weighting an artificial neural network model, the method comprising is provided. The method includes the steps of: learning, on the basis of a channel length of a 1×1 pruning unit applied in a channel direction to each of a plurality of kernels included in an artificial neural network model, a pruning factor for each of the pruning units and a weight for each of the pruning units; and determining, on the basis of at least one of the learned pruning factors and weights, which of the pruning units is to be removed from the artificial neural network model, wherein the channel length of the pruning unit is shorter than a channel length of at least a part of the plurality of kernels.

6 Claims, 7 Drawing Sheets

(56) References Cited

U.S. PATENT DOCUMENTS

| 11,651,835 | B1 * | 5/2023 | Kim | G11C 29/44 |
| | | | | 365/200 |
| 11,743,477 | B1 * | 8/2023 | Im | G06N 3/0464 |
| | | | | 375/240.02 |
| 11,831,887 | B1 * | 11/2023 | Im | H04N 19/30 |
| 11,854,536 | B2 * | 12/2023 | Ahn | G06N 3/08 |
| 12,400,117 | B2 * | 8/2025 | Hu | G06N 3/045 |
| 12,579,416 | B1 * | 3/2026 | Duong | G06N 3/063 |
| 12,579,419 | B1 * | 3/2026 | Jang | G06N 3/063 |
| 2019/0147319 | A1 * | 5/2019 | Kim | G06F 12/0215 |
| | | | | 706/15 |
| 2021/0125380 | A1 * | 4/2021 | Lee | H04N 19/154 |
| 2021/0174669 | A1 * | 6/2021 | Guan | G06V 20/584 |
| 2021/0264278 | A1 * | 8/2021 | Liu | G06N 3/096 |
| 2021/0407081 | A1 * | 12/2021 | Bae | A61B 5/4504 |
| 2022/0114453 | A1 * | 4/2022 | Lee | G06N 3/082 |
| 2022/0147791 | A1 * | 5/2022 | Yao | G06N 3/084 |
| 2022/0207336 | A1 * | 6/2022 | Kim | G06N 3/045 |
| 2022/0245931 | A1 * | 8/2022 | Choi | G06V 10/82 |
| 2022/0343523 | A1 * | 10/2022 | Cho | H04N 25/00 |
| 2022/0366588 | A1 * | 11/2022 | Cho | G06V 10/82 |
| 2022/0383092 | A1 * | 12/2022 | Zhao | G06N 3/0985 |
| 2023/0005269 | A1 * | 1/2023 | Kim | G06V 10/82 |
| 2023/0019275 | A1 * | 1/2023 | Sombatsiri | G06N 3/08 |
| 2023/0130747 | A1 * | 4/2023 | Yamazaki | G06N 3/045 |
| | | | | 706/25 |
| 2023/0168921 | A1 * | 6/2023 | Kim | G06F 15/80 |
| | | | | 712/220 |
| 2023/0276063 | A1 * | 8/2023 | Kim | H04N 19/30 |
| | | | | 375/240.08 |
| 2023/0334632 | A1 * | 10/2023 | Yin | G06V 10/771 |
| 2023/0401450 | A1 * | 12/2023 | Ye | G06N 3/0464 |
| 2024/0048711 | A1 * | 2/2024 | Piao | G06N 3/08 |
| 2024/0054602 | A1 * | 2/2024 | Lee | G06V 10/993 |
| 2024/0064336 | A1 * | 2/2024 | Kim | H04N 19/132 |
| 2024/0089475 | A1 * | 3/2024 | Yu | H04N 19/42 |
| 2024/0104375 | A1 * | 3/2024 | Park | G06N 3/04 |
| 2024/0145086 | A1 * | 5/2024 | Kim | G06N 3/063 |
| 2024/0152738 | A1 * | 5/2024 | Park | G06N 3/045 |
| 2024/0187581 | A1 * | 6/2024 | Park | H04N 19/117 |
| 2024/0211721 | A1 * | 6/2024 | Lee | G06N 3/04 |
| 2024/0282071 | A1 * | 8/2024 | Lakshman | H04N 25/79 |

OTHER PUBLICATIONS

Howard, Andrew G., et al., "MobileNets: Efficient Convolutional Neural Networks for Mobile Vision Applications", Apr. 17, 2017.

* cited by examiner

ResNet Structure

| layer name | output size | 18-layer | 34-layer | 50-layer | 101-layer | 152-layer |
|---|---|---|---|---|---|---|
| conv1 | 112×112 | 7×7, 64, stride 2 | | | | |
| conv2_x | 56×56 | 3×3 max pool, stride 2 | | | | |
| conv2_x | 56×56 | $\begin{bmatrix} 3{\times}3, 64 \\ 3{\times}3, 64 \end{bmatrix} \times 2$ | $\begin{bmatrix} 3{\times}3, 64 \\ 3{\times}3, 64 \end{bmatrix} \times 3$ | $\begin{bmatrix} 1{\times}1, 64 \\ 3{\times}3, 64 \\ 1{\times}1, 256 \end{bmatrix} \times 3$ | $\begin{bmatrix} 1{\times}1, 64 \\ 3{\times}3, 64 \\ 1{\times}1, 256 \end{bmatrix} \times 3$ | $\begin{bmatrix} 1{\times}1, 64 \\ 3{\times}3, 64 \\ 1{\times}1, 256 \end{bmatrix} \times 3$ |
| conv3_x | 28×28 | $\begin{bmatrix} 3{\times}3, 128 \\ 3{\times}3, 128 \end{bmatrix} \times 2$ | $\begin{bmatrix} 3{\times}3, 128 \\ 3{\times}3, 128 \end{bmatrix} \times 4$ | $\begin{bmatrix} 1{\times}1, 128 \\ 3{\times}3, 128 \\ 1{\times}1, 512 \end{bmatrix} \times 4$ | $\begin{bmatrix} 1{\times}1, 128 \\ 3{\times}3, 128 \\ 1{\times}1, 512 \end{bmatrix} \times 4$ | $\begin{bmatrix} 1{\times}1, 128 \\ 3{\times}3, 128 \\ 1{\times}1, 512 \end{bmatrix} \times 8$ |
| conv4_x | 14×14 | $\begin{bmatrix} 3{\times}3, 256 \\ 3{\times}3, 256 \end{bmatrix} \times 2$ | $\begin{bmatrix} 3{\times}3, 256 \\ 3{\times}3, 256 \end{bmatrix} \times 6$ | $\begin{bmatrix} 1{\times}1, 256 \\ 3{\times}3, 256 \\ 1{\times}1, 1024 \end{bmatrix} \times 6$ | $\begin{bmatrix} 1{\times}1, 256 \\ 3{\times}3, 256 \\ 1{\times}1, 1024 \end{bmatrix} \times 23$ | $\begin{bmatrix} 1{\times}1, 256 \\ 3{\times}3, 256 \\ 1{\times}1, 1024 \end{bmatrix} \times 36$ |
| conv5_x | 7×7 | $\begin{bmatrix} 3{\times}3, 512 \\ 3{\times}3, 512 \end{bmatrix} \times 2$ | $\begin{bmatrix} 3{\times}3, 512 \\ 3{\times}3, 512 \end{bmatrix} \times 3$ | $\begin{bmatrix} 1{\times}1, 512 \\ 3{\times}3, 512 \\ 1{\times}1, 2048 \end{bmatrix} \times 3$ | $\begin{bmatrix} 1{\times}1, 512 \\ 3{\times}3, 512 \\ 1{\times}1, 2048 \end{bmatrix} \times 3$ | $\begin{bmatrix} 1{\times}1, 512 \\ 3{\times}3, 512 \\ 1{\times}1, 2048 \end{bmatrix} \times 3$ |
| | 1×1 | average pool, 1000-d fc, softmax | | | | |
| FLOPs | | $1.8 \times 10^9$ | $3.6 \times 10^9$ | $3.8 \times 10^9$ | $7.6 \times 10^9$ | $11.3 \times 10^9$ |

METHOD AND SYSTEM FOR LIGHTWEIGHTING ARTIFICIAL NEURAL NETWORK MODEL, AND NON-TRANSITORY COMPUTER-READABLE RECORDING MEDIUM

CROSS-REFERENCE TO RELATED APPLICATION(S)

This application is a national phase of Patent Cooperation Treaty (PCT) International Application No. PCT/KR2021/016656 filed on Nov. 15, 2021, which claims priority to Korean Patent Application No. 10-2020-0188895 filed on Dec. 31, 2020. The entire contents of PCT International Application No. PCT/KR2021/016656 and Korean Patent Application No. 10-2020-0188895 are hereby incorporated by reference.

This application is based on the project conducted as follows:

Project Identification Number: 2021-0-01766

Ministry Name: Ministry of Science and ICT of Korea

Research Program Title: Public-Private Partnership based ICT Startup Development Program Research Project Title: Research and development of an scalable offline space analysis solution Research Management Institution: Institute of Information & Communications Technology Planning and Evaluation Contribution Rate: 100%

Host Research Institute: mAy-I Inc.

Research Period: Jul. 1, 2021 through Dec. 31, 2023

FIELD OF THE INVENTION

The present invention relates to a method, system, and non-transitory computer-readable recording medium for light-weighting an artificial neural network model.

BACKGROUND

Artificial neural network models have been developed to learn a large amount of parameters (e.g., weights) in order to achieve high performance. However, the artificial neural network models trained in this way have a limitation that the large capacity and operation amount required for inference make the models difficult to use in edge computing (e.g., mobile, Internet of Things (IoT), or embedded) environments with limited computing resources.

In order to overcome the limitation, various methods have been recently introduced to light-weight the artificial neural network models. Pruning, among these methods, refers to a technique for reducing the capacity and operation amount required for inference of an artificial neural network model by, for example, removing less important weights from the artificial neural network model among a large number of weights learned by the model.

In general, the pruning may be classified into weighted pruning where it is determined whether to remove each weight and structured pruning where it is determined whether to remove weights by a specific structure unit (e.g., a kernel, a specific channel in the kernel, or a layer). Although the weighted pruning has the advantage of significantly reducing the number of weights and the operation amount required for inference, it has the disadvantage that the pruned model has a sparse matrix structure and thus separate hardware or additional programming is required to fully benefit from the capacity and operation amount reduced by the pruning. Due to the disadvantage, most of recent pruning techniques use structured pruning, especially pruning by a kernel unit or channel unit.

However, the techniques introduced so far have limitations that it is difficult to share weights in a specific layer with other layers (specifically, layers at different stages), and that additional learning is required to modify an already trained artificial neural network model, such as increasing a ratio of weights pruned in the artificial neural network model.

In this connection, the inventor(s) present a technique for making a channel length of a 1×1 pruning unit applied in a channel direction to each of a plurality of kernels shorter than a channel length of at least a part of the plurality of kernels, thereby allowing weights in a specific layer to be shared with other layers, and also allowing an already trained artificial neural network model to be modified at minimal cost.

SUMMARY OF THE INVENTION

One object of the present invention is to solve all the above-described problems in prior art.

Another object of the invention is to learn, on the basis of a channel length of a 1×1 pruning unit applied in a channel direction to each of a plurality of kernels included in an artificial neural network model, a pruning factor for each of the pruning units and a weight for each of the pruning units, and determine, on the basis of at least one of the learned pruning factors and weights, which of the pruning units is to be removed from the artificial neural network model, wherein the channel length of the 1×1 pruning unit is shorter than a channel length of at least a part of the plurality of kernels.

Yet another object of the invention is to allow weights in a specific layer included in an artificial neural network model to be shared with other layers.

Still another object of the invention is to modify an already trained artificial neural network model at minimal cost.

The representative configurations of the invention to achieve the above objects are described below.

According to one aspect of the invention, there is provided a method comprising the steps of: learning, on the basis of a channel length of a 1×1 pruning unit applied in a channel direction to each of a plurality of kernels included in an artificial neural network model, a pruning factor for each of the pruning units and a weight for each of the pruning units; and determining, on the basis of at least one of the learned pruning factors and weights, which of the pruning units is to be removed from the artificial neural network model, wherein the channel length of the pruning unit is shorter than a channel length of at least a part of the plurality of kernels.

According to another aspect of the invention, there is provided a system comprising: a pruning factor learning unit configured to learn, on the basis of a channel length of a 1×1 pruning unit applied in a channel direction to each of a plurality of kernels, a pruning factor for each of the pruning units and a weight for each of the pruning units; and an artificial neural network model management unit configured to determine, on the basis of at least one of the learned pruning factors and weights, which of the pruning units is to be removed from an artificial neural network model, wherein the channel length of the pruning unit is shorter than a channel length of at least a part of the plurality of kernels.

In addition, there are further provided other methods and systems to implement the invention, as well as non-transitory computer-readable recording media having stored thereon computer programs for executing the methods.

According to the invention, it is possible to learn, on the basis of a channel length of a 1×1 pruning unit applied in a channel direction to each of a plurality of kernels included in an artificial neural network model, a pruning factor for each of the pruning units and a weight for each of the pruning units, and determine, on the basis of at least one of the learned pruning factors and weights, which of the pruning units is to be removed from the artificial neural network model, wherein the channel length of the 1×1 pruning unit is shorter than a channel length of at least a part of the plurality of kernels.

According to the invention, it is possible to allow weights in a specific layer included in an artificial neural network model to be shared with other layers.

According to the invention, it is possible to modify an already trained artificial neural network model at minimal cost.

BRIEF DESCRIPTION OF THE DRAWINGS

FIG. 6 shows the structure of a ResNet.

DETAILED DESCRIPTION

Figure 1:
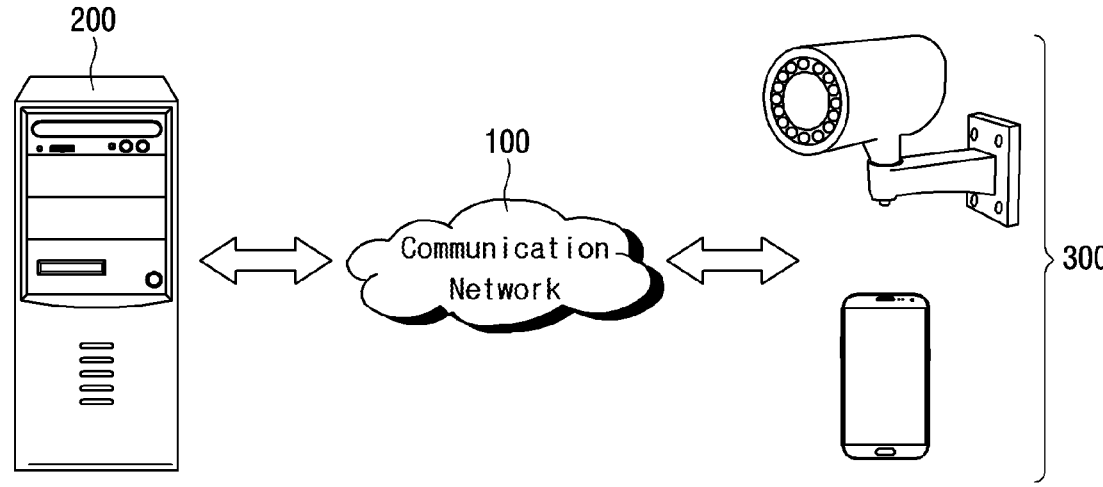
FIG. 1 schematically shows the configuration of an entire system for light-weighting an artificial neural network model according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for light-weighting an artificial neural network model according to one embodiment of the invention.

As shown in FIG. 1, the entire system according to one embodiment of the invention may comprise a communication network 100, an artificial neural network model light-weighting system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the artificial neural network model light-weighting system 200 according to one embodiment of the invention may function to learn, on the basis of a channel length of a 1×1 pruning unit applied in a channel direction to each of a plurality of kernels included in an artificial neural network model, a pruning factor for each of the pruning units and a weight for each of the pruning units, and determine, on the basis of at least one of the learned pruning factors and weights, which of the pruning units is to be removed from the artificial neural network model, wherein the channel length of the 1×1 pruning unit is shorter than a channel length of at least a part of the plurality of kernels.

The configuration and functions of the artificial neural network model light-weighting system 200 according to the invention will be discussed in more detail below.

Next, the device 300 according to one embodiment of the invention is digital equipment capable of connecting to and then communicating with the artificial neural network model light-weighting system 200, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDAs), a web pad, and a mobile phone, may be adopted as the device 300 according to the invention. Further, the device 300 according to one embodiment of the invention may include a video capture module (e.g., a CCTV or an IP camera) or may refer to a video capture module itself. According to one embodiment of the invention, the video capture module may encompass a recorder (e.g., a digital video recorder (DVR) or a network video recorder (NVR)) for storing a video captured by the video capture module.

In particular, the device 300 may include an application (not shown) for assisting a user to receive services such as artificial neural network model management (e.g., distribution of a light-weighted artificial neural network model) from the artificial neural network model light-weighting system 200. The application may be downloaded from the artificial neural network model light-weighting system 200 or an external application distribution server (not shown) Meanwhile, the characteristics of the application may be generally similar to those of a pruning factor learning unit 210, an artificial neural network model management unit 220, a communication unit 230, and a control unit 240 of the artificial neural network model light-weighting system 200 to be described below. Here, at least a part of the application may be replaced with a hardware device or a firmware device that may perform a substantially equal or equivalent function, as necessary.

Configuration of the Artificial Neural Network Model Light-Weighting System

Hereinafter, the internal configuration of the artificial neural network model light-weighting system 200 crucial for implementing the invention and the functions of the respective components thereof will be discussed.

Figure 2:
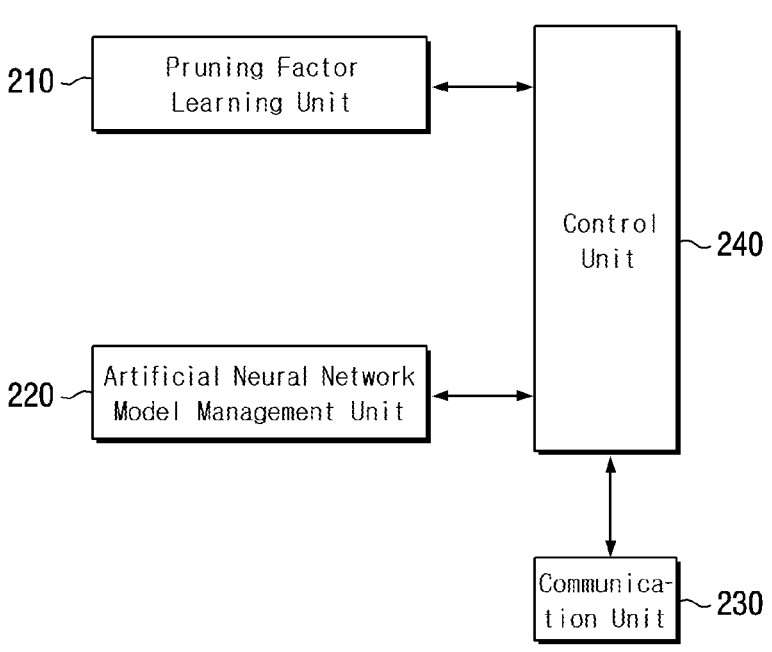
FIG. 2 specifically shows the internal configuration of an artificial neural network model light-weighting system according to one embodiment of the invention.

FIG. 2 specifically shows the internal configuration of the artificial neural network model light-weighting system 200 according to one embodiment of the invention.

As shown in FIG. 2, the artificial neural network model light-weighting system 200 according to one embodiment of the invention may comprise a pruning factor learning unit 210, an artificial neural network model management unit 220, a communication unit 230, and a control unit 240. According to one embodiment of the invention, at least some of the pruning factor learning unit 210, the artificial neural network model management unit 220, the communication unit 230, and the control unit 240 may be program modules to communicate with an external system (not shown). The program modules may be included in the artificial neural network model light-weighting system 200 in the form of operating systems, application program modules, or other program modules, while they may be physically stored in a variety of commonly known storage devices. Further, the program modules may also be stored in a remote storage device that may communicate with the artificial neural network model light-weighting system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the artificial neural network model light-weighting system 200 has been described as above, and it will be apparent to those skilled in the art that at least a part of the components or functions of the artificial neural network model light-weighting system 200 may be implemented in the device 300 or a server (not shown) or included in an external system (not shown), as necessary.

First, the pruning factor learning unit 210 according to one embodiment of the invention may function to learn, on the basis of a channel length of a 1×1 pruning unit applied in a channel direction to each of a plurality of kernels, a pruning factor for each of the pruning units and a weight for each of the pruning units, wherein the channel length of the 1×1 pruning unit is shorter than a channel length of at least a part of the plurality of kernels.

Specifically, a pruning unit may refer to a unit by which a parameter (e.g., weight) is removed when pruning is performed to light-weight an artificial neural network model, and traditional pruning techniques employ a kernel, channel, layer, or the like as a pruning unit. The present invention employs a partition of a stripe as a pruning unit (which may be referred to as a mini stripe in the following description and drawings), and the pruning unit will be described in detail below with reference to FIGS. 3 and 4. Meanwhile, as used herein, partitioning a kernel or stripe does not necessarily mean physically partitioning the kernel or stripe, but should be understood to encompass treating the kernel or stripe as two or more separate pruning units (i.e., conceptual partitioning).

Figure 3:
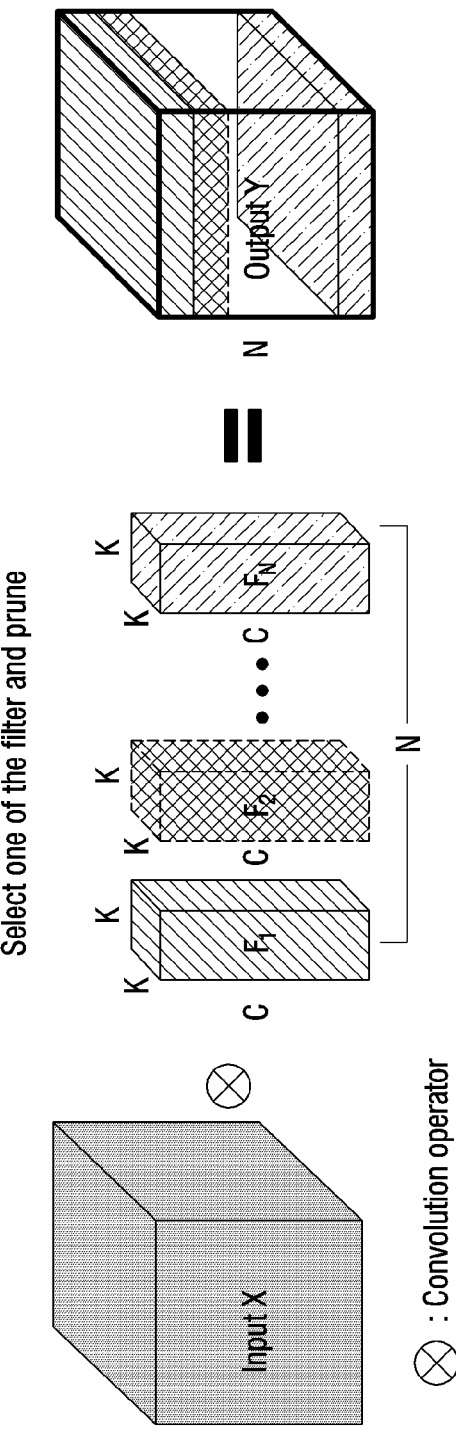
FIG. 3 illustratively shows how to perform pruning.
Figures 4A, 4B:
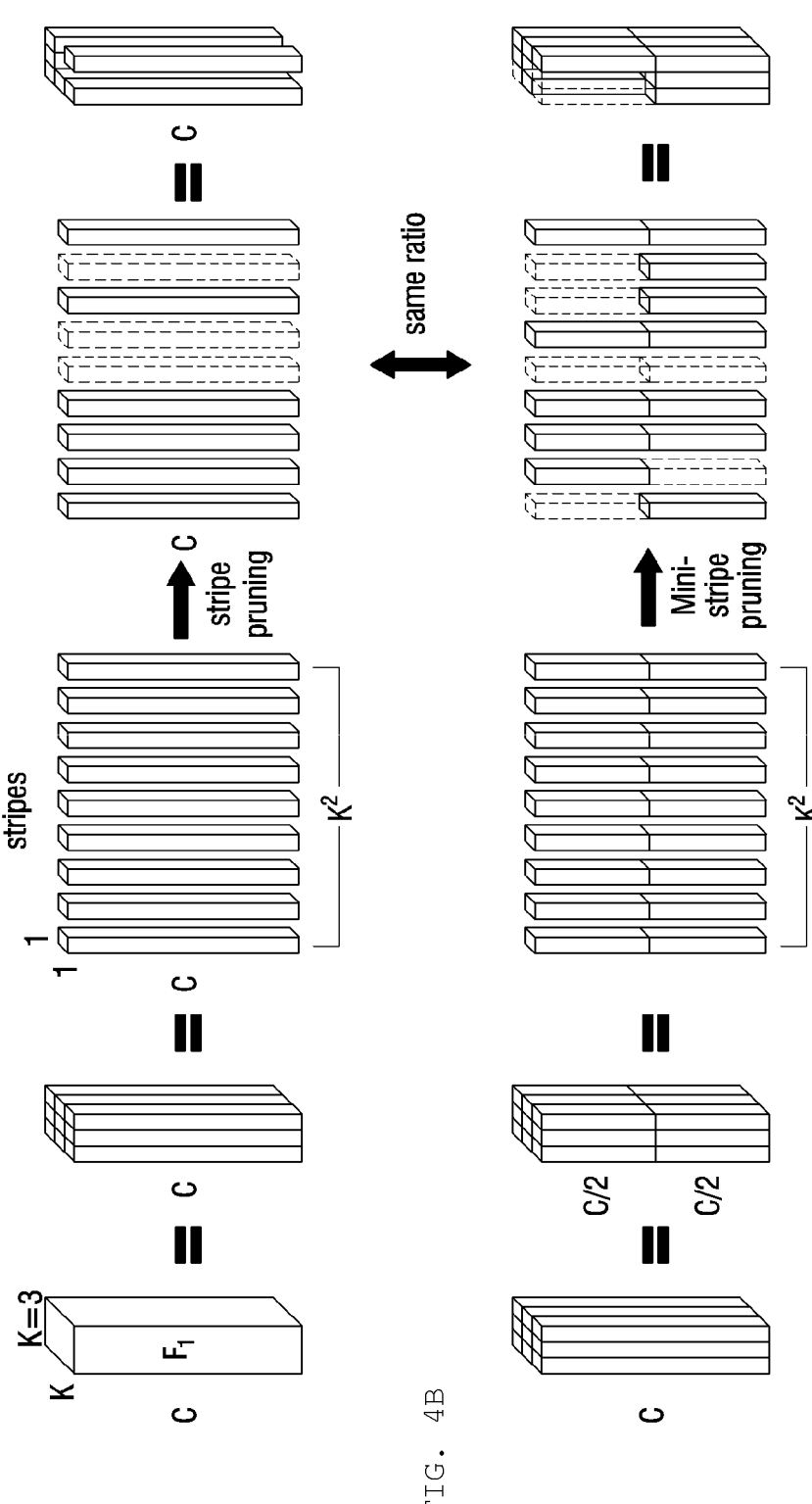
FIGS. 4A and 4B illustratively show how to perform pruning.

FIG. 3 and FIG. 4A illustratively show how to perform pruning.

Referring to FIG. 3, it is depicted how to perform pruning when a kernel (i.e., filter) is employed as a pruning unit. For example, if a second kernel ($F_2$) among N K×K kernels ($F_1$ to $F_N$) (whose channel length is C) used in a specific layer is determined as a pruning unit to be removed from an artificial neural network model, a second channel of K×K kernels used in the next layer may be determined to be removed.

Referring to FIG. 4A, it is depicted how to perform pruning when a stripe is employed as a pruning unit. Here, when a K×K kernel is partitioned into $K^2$ 1×1 kernels in a channel direction, the stripe is each of the $K^2$ 1×1 kernels. That is, the stripe refers to a pruning unit applied in a channel direction to a kernel used in a specific layer, and has a channel length equal to the channel length of the kernel. For example, a 3×3 kernel ($F_1$) (whose channel length is C) used in a specific layer may be treated as nine stripes (whose channel length is C). Then, at least a part (e.g., three) of the nine stripes may be determined as pruning units to be removed from the artificial neural network model.

FIG. 4B illustratively shows how to perform pruning according to one embodiment of the invention.

Referring to FIG. 4B, it is depicted how to perform pruning on the basis of a 1×1 pruning unit applied in a channel direction to each of a plurality of kernels according to one embodiment of the invention. Here, according to one embodiment of the invention, the 1×1 pruning unit may correspond to a partition of the stripe as described above. For example, according to one embodiment of the invention, if a channel length of the 1×1 pruning unit is C/2, a 3×3 kernel (whose channel length is C) used in a specific layer may be treated as 18 1×1 pruning units (whose channel length is C/2). Then, the artificial neural network model management unit 220 according to one embodiment of the invention may determine at least a part (e.g., six) of the 18 stripes as pruning units to be removed from the artificial neural network model.

Further, the channel length of the 1×1 pruning unit according to one embodiment of the invention may be commonly applied to a plurality of convolution layers included in the artificial neural network model. That is, the channel length of the 1×1 pruning unit according to one embodiment of the invention may be fixed (i.e., constant) within a particular artificial neural network model. Meanwhile, since convolution layers and convolutional operations are common terms used in the field of artificial neural network technology, a detailed description thereof will be omitted.

Specifically, a channel length of a kernel may change as layers or stages change in an artificial neural network model, and since a channel length of a stripe is equal to a channel length of a kernel to which the stripe is applied, the channel length of the stripe changes as the channel length of the kernel changes. (That is, a channel length of a stripe is variable within a particular artificial neural network model). However, unlike the channel length of the stripe, a channel length of a 1×1 pruning unit according to one embodiment of the invention may not change as a channel length of a kernel to which the pruning unit is applied changes. Accordingly, the channel length of the 1×1 pruning unit according to one embodiment of the invention may be shorter than a channel length of at least a part of a plurality of kernels included in the artificial neural network model.

FIG. 6 shows the structure of a ResNet.

For example, referring to FIG. 6, according to one embodiment of the invention, 3×3 kernels used in a second stage (conv2_x) of a 18-layer ResNet have a channel length of 64, whereas 1×1 pruning units used in that stage may have a channel length of 32 (or 64). Further, 3×3 kernels used in a third stage (conv3_x), a fourth stage (conv4_x), and a fifth stage (conv5_x) of the 18-layer ResNet have channel lengths of 128, 256, and 512, respectively, whereas 1×1 pruning units used in those stages may have a channel length of 32 (or 64) as in the second stage.

In addition, the channel length of the 1×1 pruning unit according to one embodiment of the invention may be a power of two (i.e., a square of two, a cube of two, a fourth power of two, and the like). Since the number of kernels used in each layer is set to a power of two in most artificial neural network models, the following description of the invention may be generally applied to most artificial neural network models.

Meanwhile, the pruning factor learning unit 210 according to one embodiment of the invention may learn pruning factors and weights on the basis of a channel length of a 1×1 pruning unit according to one embodiment of the invention (wherein the channel length of the 1×1 pruning unit is shorter than a channel length of at least a part of a plurality of kernels), and the pruning factors and weights may be related to each 1×1 pruning unit. Here, according to one embodiment of the invention, the weight for each pruning unit may refer to a weight included in each pruning unit, and since the manner of learning the weights by the pruning factor learning unit 210 according to one embodiment of the invention is the same as the manner of learning weights in a general artificial neural network model, a detailed description thereof will be omitted.

Specifically, according to one embodiment of the invention, a pruning factor for each 1×1 pruning unit is employed for determining whether to remove the corresponding 1×1 pruning unit from the artificial neural network model, and may refer to, for example, a gate factor, a scaling factor, or a sum of weights included in the corresponding 1×1 pruning unit (e.g., L1 norm).

For example, when the pruning factor is a scaling factor, the pruning factor learning unit 210 according to one embodiment of the invention may learn the pruning factor by learning a scaling factor given to each 1×1 pruning unit and then removing the 1×1 pruning unit in order of increasing size of the learned scaling factor (i.e., importance of weights included in the corresponding 1×1 pruning unit) or according to whether the size is below a predetermined reference value, and re-learning the pruning factor.

As another example, when the pruning factor is a sum of weights included in the corresponding 1×1 pruning unit (e.g., L1 norm), the pruning factor learning unit 210 according to one embodiment of the invention may learn the pruning factor by removing the 1×1 pruning unit on the basis of the sum of the weights and re-learning the pruning factor.

As another example, when the pruning factor is a gate factor, the pruning factor learning unit 210 according to one embodiment of the invention may learn the gate factor using gradient descent. Specifically, the pruning factor learning unit 210 according to one embodiment of the invention may learn the gate factor by applying a real number parameter (e.g., a scaling factor) to a Heaviside step function during forward propagation, whereby the gate factor may maintain a value of 0 or 1. Further, the pruning factor learning unit 210 according to one embodiment of the invention may learn the gate factor by replacing the Heaviside step function with a differentiable sigmoid function during back propagation. Learning the gate factor in the manner as described above has the advantage that re-learning is not required unlike the embodiments related to the scaling factor or L1 norm. Meanwhile, according to one embodiment of the invention, the gate factor may be multiplied by the 1×1 pruning unit before a convolutional operation is performed, and may be multiplied by channel values of an output tensor after the convolutional operation is performed.

However, the type of the pruning factor and the method of learning the pruning factor according to one embodiment of the invention are not limited to the foregoing, and may be diversely changed as long as the objects of the invention may be achieved.

A loss function used by the pruning factor learning unit 210 according to one embodiment of the invention to learn the pruning factor may be in the form of a basic loss function of an artificial neural network model (e.g., a cross entropy function for classification) with a specific function being added. For example, according to one embodiment of the invention, the specific function may be the L1 norm value of the pruning factor multiplied by a penalty constant lambda, wherein the pruning factor may be learned in a manner that more 1×1 pruning units are removed as the penalty constant lambda is greater. However, the loss function used by the pruning factor learning unit 210 according to one embodiment of the invention to learn the pruning factor is not limited to the foregoing, and may be diversely changed as long as the objects of the invention may be achieved.

Next, the artificial neural network model management unit 220 according to one embodiment of the invention may function to determine which of the 1×1 pruning units is to be removed from an artificial neural network model, on the basis of at least one of the pruning factors and weights learned by the pruning factor learning unit 210 according to one embodiment of the invention.

Specifically, the artificial neural network model management unit 220 according to one embodiment of the invention may determine a 1×1 pruning unit that has little or no influence on an inference result of the artificial neural network model as a pruning unit to be removed from the artificial neural network model. For example, when a pruning factor for a 1×1 pruning unit has a specific value (e.g., when a value of a gate factor is zero) or falls below a predetermined reference value (e.g., when a value of a scaling factor is not greater than a threshold value), the artificial neural network model management unit 220 according to one embodiment of the invention may determine the 1×1 pruning unit as a pruning unit to be removed from the artificial neural network model.

Further, when a particular 1×1 pruning unit is equal to (or may be treated as being equal to) another 1×1 pruning unit (e.g., when a weight included in the particular 1×1 pruning unit is equal to (or may be treated as being equal to) a weight included in the other 1×1 pruning unit), the artificial neural network model management unit 220 according to one embodiment of the invention may determine that only one of the 1×1 pruning units is to be stored and the other 1×1 pruning unit is to be removed from the artificial neural network model. Furthermore, since the channel length of the 1×1 pruning unit according to one embodiment of the invention may be commonly applied to a plurality of convolution layers included in the artificial neural network model as described above, the artificial neural network model management unit 220 according to one embodiment of the invention may ensure that the pruning unit to be removed is shared (i.e., its weight is shared) in a first convolution layer and a second convolution layer having a different channel length from the first convolution layer. This increases the number of 1×1 pruning units that may be shared within an artificial neural network model compared to the conventional techniques, which enables a higher level of light-weighting.

Figure 7:
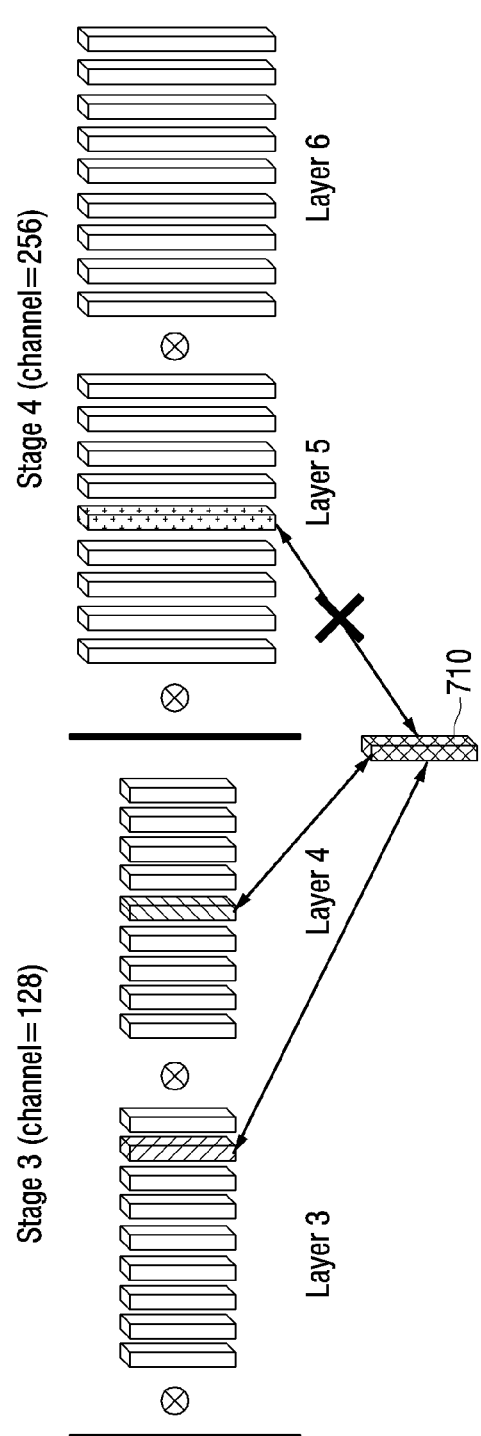
FIG. 7 illustratively shows how to share weights between a plurality of convolution layers.
Figure 8:
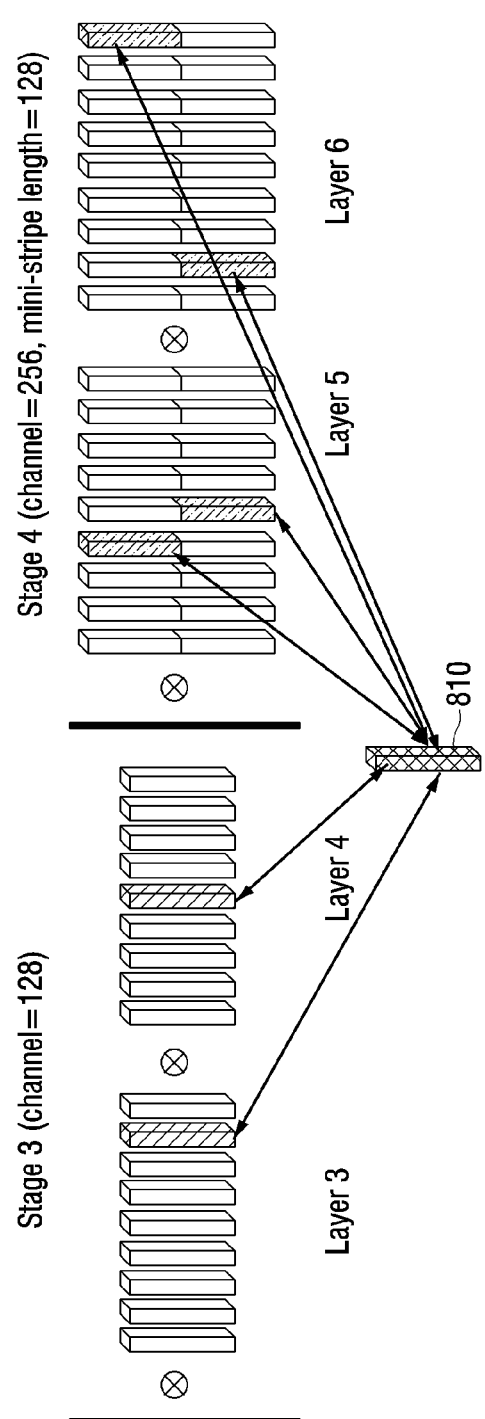
FIG. 8 illustratively shows how to share weights between a plurality of convolution layers.

FIGS. 7 and 8 illustratively show how to share weights between a plurality of convolution layers.

For example, referring to FIGS. 7 and 8, it may be assumed that a convolution layer of stage 3 of an artificial neural network model has a channel length of 128 and a convolution layer of stage 4 of the artificial neural network model has a channel length of 256. In this case, referring to FIG. 7, when stripes are employed as pruning units, a channel length of a stripe changes as a channel length of a convolution layer changes, so that a stripe 710 shared between layers 3 and 4 of stage 3 may not be shared with layer 5 of stage 4. In contrast, referring to FIG. 8, when 1×1 pruning units are employed according to one embodiment of the invention (wherein a channel length of a 1×1 pruning unit is shorter than a channel length of at least a part of a plurality of kernels), a 1×1 pruning unit 810 shared between layers 3 and 4 of stage 3 may be shared with layers 5 and 6 of stage 4.

Meanwhile, when the 1×1 pruning unit to be removed from the artificial neural network model is determined as above, the artificial neural network model management unit 220 according to one embodiment of the invention may remove the determined pruning unit from the artificial neural network model.

Figure 5:
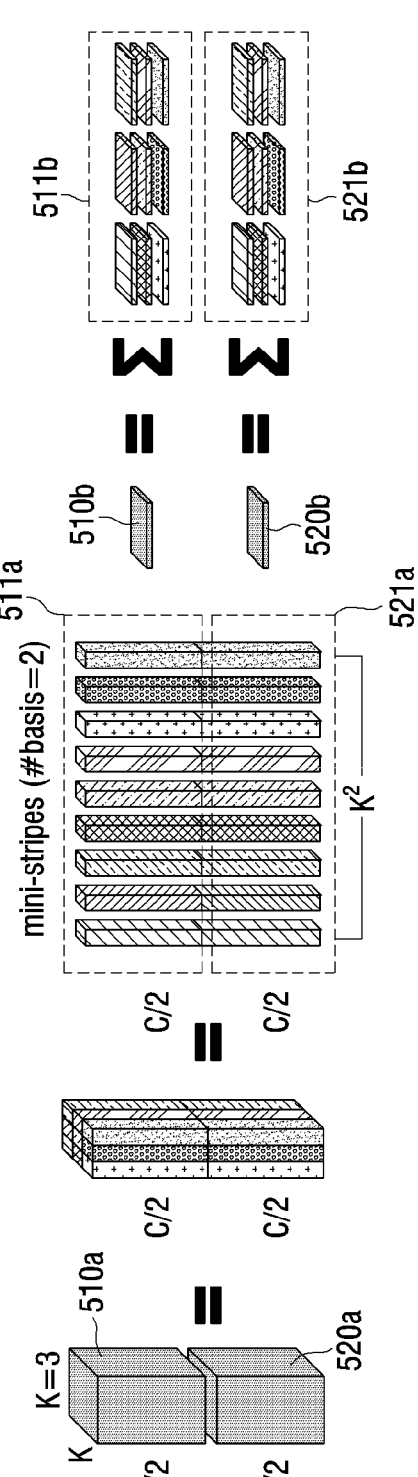
FIG. 5 illustratively shows an inference process of an artificial neural network model according to one embodiment of the invention.

FIG. 5 illustratively shows an inference process of an artificial neural network model according to one embodiment of the invention.

Specifically, referring to FIG. 5, it may be assumed that a channel length of a K×K kernel used in a specific layer is C, and a channel length of a 1×1 pruning unit is C/2. In this case, when one K×K kernel is partitioned into two (510*a* and 520*a*) and each of the partitioned kernels is partitioned into $K^2$ pieces (511*a* and 521*a*), each of the pieces may be considered as a single 1×1 pruning unit. Further, a result of a convolutional operation (510*b* and 520*b*) on an input tensor and each of the partitioned kernels (510*a* and 520*a*) is an appropriate sum of a result of a convolutional operation (511*b* and 521*b*) on the input tensor and each of the 1×1 pruning units (511*a* and 521*a*). Here, assuming that all of the 1×1 pruning units (511*a* and 521*a*) corresponding to one K×K kernel in the specific layer are removed from the artificial neural network model, the artificial neural network model management unit 220 according to one embodiment of the invention may light-weight the artificial neural network model by removing channels associated with the removed 1×1 pruning units (511*a* and 521*a*) with respect to a part of 1×1 pruning units used in the next layer.

Meanwhile, the part of the 1×1 pruning units in the next layer whose channels are removed as above may be determined according to which of kernels in the specific layer corresponds to the 1×1 pruning units (511*a* and 521*a*) removed from the specific layer. For example, assuming that all 1×1 pruning units for a $40^{th}$ kernel among 64 kernels in a specific layer have been removed, and that 511a and 521*a* represent 1×1 pruning units corresponding to kernels used in the next layer (whose channel length is 64), an eighth channel of the 1×1 pruning unit 521*a* for which a convolutional operation is performed with $33^{rd}$ through $64^{th}$ channels, rather than the 1×1 pruning unit 511*a* for which a convolutional operation is performed with first through $32^{nd}$ channels, may be removed with respect to every kernel used in the next layer.

Meanwhile, according to the conventional techniques, an artificial neural network model that has performed learning with a specific pruning ratio should disadvantageously relearn a pruning factor and the like in order to change the pruning ratio. However, according to the invention, it is possible to change the pruning ratio of the artificial neural network model even when the pruning factor is learned only once.

For example, according to one embodiment of the invention, when learning is performed with a pruning ratio of 20% (i.e., with 80% of weights being removed), the channel length of the 1×1 pruning unit used in the artificial neural network model may be set to be shorter so that the pruning ratio is reduced (i.e., the percentage of removed weights is increased). In this case, assuming that the pruning factor is a scaling factor, the channel length of the 1×1 pruning unit is set to half the original channel length, the weight of the original 1×1 pruning unit is $W_A$, and the scaling factor of that pruning unit is A, scaling factors of two 1×1 pruning units whose channel lengths are reduced (whose weights are $W_1$ and $W_2$, respectively) may be calculated as $A×|W_1|/|W_A|$ and $A×|W_2|/|W_A|$, respectively, even without additional learning.

Meanwhile, when the channel length of the 1×1 pruning unit is changed as above, the pruning ratio, accuracy, capacity, and/or operation amount of the artificial neural network model are nonlinearly changed. The artificial neural network model management unit 220 according to one embodiment of the invention may utilize this property to distribute artificial neural network models of various structures to the device 300 with only one-time learning, and consequently ensure that artificial neural network models suitable for various edge computing environments are used.

Next, the communication unit 230 according to one embodiment of the invention may function to enable data transmission/reception from/to the pruning factor learning unit 210 and the artificial neural network model management unit 220.

Lastly, the control unit 240 according to one embodiment of the invention may function to control data flow among the pruning factor learning unit 210, the artificial neural network model management unit 220, and the communication unit 230. That is, the control unit 240 according to one embodiment of the invention may control data flow into/out of the artificial neural network model light-weighting system 200 or data flow among the respective components of the artificial neural network model light-weighting system 200, such that the pruning factor learning unit 210, the artificial neural network model management unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:
1. A method for a device connecting to and communicating with an
artificial neural network model light-weighting system, wherein the device includes an application for a user to receive distribution of a light-weighted artificial neural network model services, the method comprising the steps of:
downloading, from the artificial neural network model light-weighting system, the application;
learning, by the application, on the basis of a channel length of a 1×1 pruning unit applied in a channel direction to each of a plurality of kernels included in an artificial neural network model, a pruning factor for each of the pruning units and a weight for each of the pruning units; and
determining, on the basis of at least one of the learned pruning factors and weights, which of the pruning units is to be removed from the artificial neural network model, wherein the channel length of the pruning unit is shorter than a channel length of at least a part of the plurality of kernels, wherein
artificial neural network models of various structures are distributed to the device with only one-time learning and ensures
that artificial neural network models suitable for various edge computing environments.

2. The method of claim 1, wherein the channel length of the pruning unit is commonly applied to a plurality of convolution layers included in the artificial neural network model.

3. The method of claim 2, wherein the plurality of convolution layers include a first convolution layer and a second convolution layer having a different channel length from the first convolution layer, and
wherein in the determining step, the pruning unit to be removed is shared in the first convolution layer and the second convolution layer.

4. The method of claim 1, wherein the channel length of the pruning unit is a power of 2.

5. A non-transitory computer-readable recording medium having stored thereon a computer program for executing the method of claim 1.

6. An artificial neural network model light-weighting system where a device connects to and communicating with
artificial neural network model light-weighting system, wherein the device includes an application for a user to receive distribution of a light-weighted artificial neural network model services, the system comprising:
storing the application for downloading to the device;
a pruning factor learning unit configured to learn using the application, on the basis of a channel length of a 1×1 pruning unit applied in a channel direction to each of a plurality of kernels, a pruning factor for each of the pruning units and a weight for each of the pruning units; and
an artificial neural network model management unit configured to determine, on the basis of at least one of the learned pruning factors and weights, which of the pruning units is to be removed from an artificial neural network model, wherein the channel length of the pruning unit is shorter than a channel length of at least a part of the plurality of kernels, wherein
artificial neural network models of various structures are distributed to the device with only one-time learning and ensures that artificial
neural network models suitable for various edge computing environments.

\* \* \* \* \*